March 18, 1947.  R. BLAND ET AL  2,417,732
FISHING REEL MECHANISM
Filed Feb. 14, 1939  4 Sheets-Sheet 3

INVENTORS
REGINALD BLAND
REGINALD BARRETT BLAND
BY HARRIS, KIECH, FOSTER & HARRIS

FOR THE FIRM
ATTORNEYS.

March 18, 1947.  R. BLAND ET AL  2,417,732
FISHING REEL MECHANISM
Filed Feb. 14, 1939  4 Sheets-Sheet 4

INVENTORS
REGINALD BLAND
REGINALD BARRETT BLAND
BY HARRIS, KIECH, FOSTER & HARRIS

FOR THE FIRM
ATTORNEYS.

Patented Mar. 18, 1947

2,417,732

UNITED STATES PATENT OFFICE 2,417,732

FISHING REEL MECHANISM

Reginald Bland and Reginald Barrett Bland, Pasadena, Calif.

Application February 14, 1939, Serial No. 256,396

27 Claims. (Cl. 242—84.1)

This invention relates to fishing reel mechanisms and more particularly to an automatic, torque-responsive, speed change device adapted to drive the reel spool at different speed ratios under different load and/or transmitted torque conditions, together with other improvements in fishing reel mechanisms more particularly related to drag, free spool, and click mechanisms and associated controls.

A fishing reel normally comprises a spool on which the fishing line may be wound, and a handle geared to drive the spool at appropriate speeds. A high gear ratio is desirable when reeling in slack lines or in keeping the line taut when the rush of the fish is toward the reel, or under other conditions where high speed rather than high torque is desirable. On the other hand, under conditions of heavy load making the use of low speed and high torque desirable, a low speed ratio is advantageous. Single speed reels are usually provided with a gear ratio which represents a comprise between the ratios which are most advantageous under these extreme conditions. Two speed, manually shiftable reels have also been proposed but suffer the defect that such shifting is not only an awkward performance under actual service conditions, but also from the fact that a manual shift can rarely be operated with sufficient timeliness to anticipate the rapidly varying conditions which arise while the fish is being played.

It is an object of the present invention to provide a driving mechanism for fishing reels which automatically drives the spool at high and low speeds according to the torque reactance thereon, so that high and low speed drives are immediately and automatically available under conditions of high load and low load, respectively.

It is broadly an object to provide automatic drives of the kind described which are responsive to the transmitted torque.

In accordance with our invention such a mechanism may comprise a power transmission mechanism alternatively disposable in high and low speed drives, and a yieldable torque responsive member adapted to yield when the torque transmitted between the handle and the spool becomes high; said yield being utilized to dispose the power transmission means in low speed drive, said transmission means being otherwise disposed in high speed relationship so that under low torque non-productive of such yield the spool is always driven at high speed.

Further objects and aspects of our invention will become apparent by referring to the embodiments shown in the drawings, in which.

Figure 1:
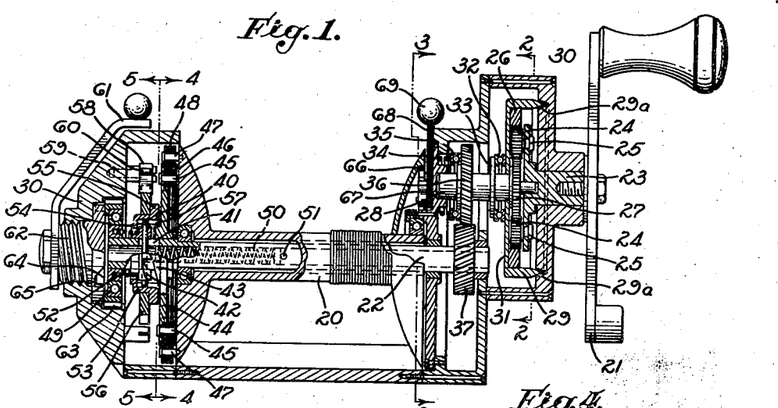
Fig. 1 is a partly sectioned view of a fishing reel illustrating certain embodiments of our automatic, two-speed, torque-responsive driving means, our click element and control therefor, and our drag member and free spool clutch and unitary control means therefor.

Referring more particularly to Fig. 1, 20 is a fishing reel spool having a hollow drum and flared end flanges and adapted to be driven through the mechanism shown by means of a handle 21. The mechanism to the right of the spool includes, in addition to the handle 21, an automatic two-speed transmission device and a torque-responsive mechanism governing the disposition of the same. The torque is finally transmitted from the right-hand side of the spool 20 to the left-hand side thereof by means of a hollow main shaft 22 around which the spool 20 is free to rotate. On the left-hand side of the spool 20 the torque is transmitted through a free spool clutch 42, 43 and a friction drag 46, 48 to near the periphery of the left flange of the spool 20.

To follow the transmission of torque in greater detail, the handle 21 is fixed to a planet carrier member 23. Planet gears 24 carried on planet gear pivots 25 are carried near the periphery of the inner disc portion of the planet carrier member 23. The planet gears 24 are rotatable on their pivots 25, or the pivots 25 may be fixed to the planet carrier 23 in such a manner as to be rotatable therein so that the planet gears 24 are rotatable with respect to the planet carrier 23. The planet carrier 23 and planet gears 24 form one element of an epicyclic gear train comprising outer ring gear 26, planet gears 24, and inner sun gear 27. The sun gear 27 is fixed to a secondary driving shaft 28. Integral with the ring gear 26 is a holding element 29 adapted to engage frictionally with a mating holding element 29a which is non-rotatably integrated with a case 30. Also integral with the ring gear 26 is a thrust plate 31 extending inwardly toward the shaft 28 and receiving through a thrust bearing 32 and a collar 33 the thrust of a helical spring 34 transmitted to the secondary driving shaft 28 by means of a thrust bearing 35 acting against a spiral gear 36 fixed to the shaft 28. Under the unrelieved action of the spring 34, the ring gear 26 is held stationary by the engagement of the holding element 29 with the case 30. Under these conditions the rotation of the planet carrier member 23 by means of the handle 21 serves to drive the sun gear 27 and the shaft 28 in the same direction as and faster than the rotation of the handle 21. The spiral gear 36 is thus caused to rotate, thereby transmitting torque to a second spiral gear 37 fixedly mounted on the main shaft 22. The torque thus transmitted to the main shaft 22 is transmitted through succeeding means hereinafter discussed and finally to the spool 20, where it becomes available for rotation of the spool 20.

The transmission of torque through obliquefaced elements such as the teeth of spiral gears 36 and 37 results in an axial end thrust proportional to the torque thus transmitted and tending to effect relative axial displacement of the spiral gears 36, 37. Provision has been made to permit a small amount of such axial displacement of the secondary drive shaft 28 by slightly recessing the end bearings of this shaft 28, such limited available movement, however, being insufficient to remove either the spiral gear 36 or the sun gear 27 from the influence of their mating gears 37 and 24. Furthermore, such end thrust is up to a certain degree counteracted by the loading on the helical spring 34, the direction of the oblique teeth on the spiral gears 36, 37 being such that the end thrust is compressive toward the spring 34. When heavy loads are applied to the spool 20, however, the increased amount of torque transmitted between the spiral gears 36, 37 develops an end thrust sufficient to overcome the loading of the helical spring 34 and to shift the secondary driving shaft 28 and its associated elements in the direction of compressing the spring 34, or to the left as seen in Fig. 1. This movement removes the pressure heretofore transmitted through the holding element 29 and allows the latter to move freely with respect to the case 30. Also, as is shown in the drawings, positive withdrawal of the holding element 29 from the case 30 may be provided for by allowing the thrust plate 31 to extend inwardly beyond the periphery of the sun gear 27 whereby the leftward displacement of the latter along with the secondary driving shaft 28 effectively removes the holding element 29 from contact with the holding element 29a.

Figure 2:
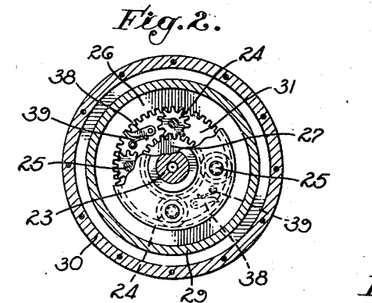
Fig. 2 is a cross-sectional view of the mechanism shown in Fig. 1 taken as indicated by the line 2—2 and illustrates detail of the ratcheted gear train.

In the absence of other restraint, the freeing of the holding element 29 would permit the ring gear 26 associated therewith to run freely, thus preventing the transmission of power. In order to avoid this condition, ratchet means 38 are interposed between the planet carrier member 23 and the ring gear 26 to prevent the latter from overrunning the planet carrier 23. This is best seen by reference to Fig. 2, which is a cross section of the epicyclic train shown in Fig. 1, the view being taken away from the handle 21. Pivotally mounted on the planet carrier member 23 is a pawl 38 actuated by a spring 39 to bear against the teeth of ring gear 26. The direction of the pawl 38 is such as to permit the relative rotation arising in the overdrive described above as resulting when the ring gear 26 was fixed relative to the case 30. Normally, the handle of a reel will be turned in a clockwise direction; consequently, as seen in Fig. 2, the rotation of the planet carrier 23 is clockwise with respect to the fixed ring gear 26, the disposition of the pawl 38 illustrated in Fig. 2 being permissive of such relative rotation. When the ring gear 26 becomes free to rotate, that is, when the increased torque has caused the restraining holding elements 29 and 29a to disengage as described, the ring gear 26 tends also to be driven by the orbital rotation of the planet gear 24 and consequently rapidly accelerates in a clockwise direction. This acceleration can continue, however, only until the speed of the ring gear 26 has reached the speed of the planet carrier member 23, since the pawl 38 is so disposed as to effectively prevent overrunning of the ring gear 26 with respect to the planet carrier 23. As soon as the ring gear 26 is thus restrained by the ratchet means 38 from further acceleration, the epicyclic train 24, 26, 27 becomes effectively integrated and rotates as a whole to provide a direct drive between the handle 21 and the secondary driving shaft 28. This direct drive provides a substantially lower speed ratio than resulted from the previously described overdrive. Our transmission therefore automatically provides for dropping to a lower speed ratio under conditions of increased torque.

When the load on the driven spool 20 again decreases, the torque transmitted between the spiral gears 36, 37 decreases, as also does the end thrust arising from the obliquity of their teeth. When the end thrust falls sufficiently that it is no longer able to compress the helical spring 34, the expansion of the spring 34 again causes integration of the holding element 29 with the case 30 through its engagement with the stationary holding element 29a, whereby the mechanism is automatically returned to overdrive conditions.

The shift from high to low speed drive, or vice versa, is thus governed by the relative magnitudes of the end thrust of the spiral gears 36, 37 and the expansive force of the spring member 34, the shift occurring when one of these forces exceeds the other. The shift may thus be caused to take place when the torque transmitted to the main shaft 22 is at any desired value by suitably modifying the characteristics of the spring 34 or of the obliquity of the teeth on the spiral gears 36, 37, or both. We find that excellent results are obtained by adjusting the spring compression to give the desired shift when a pull of two or three pounds is put on a line connected to the spool 20, or a pull just slightly in excess of that required to reel in the line and bait, although, if desired, the mechanism may be adjusted to shift when the torque exceeds or falls below any other predetermined value.

The end thrust producing relative motion of the spiral gears 36, 37 is restricted to producing axial motion in the secondary driving shaft 28 alone, the main shaft 22 on which the spiral gear 37 is rigidly attached being mounted in bearings suitably disposed to prevent axial motion of the main shaft 22.

Figure 4:
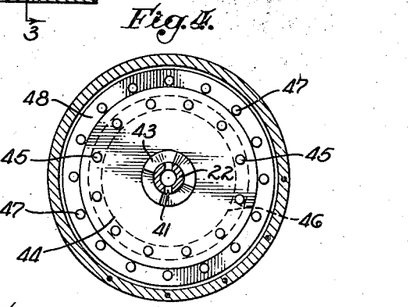
Fig. 4 is a cross-sectional view taken as indicated by the line 4—4 of Fig. 1 and illustrates the friction drag.

The main shaft 22 extends through the hollow interior of the spool 20 freely and without frictional contact therewith and projects substantially beyond the left end of the spool 20. The main driving pin 40 is carried in an axially disposed slot 41 formed in that portion of the main drive shaft 22 which extends leftward beyond the spool 20. The driving pin 40 is fixedly mounted in a dog clutch element 42, said element being free to move axially with respect to the main driving shaft 22 in accordance with the axial freedom of movement of the pin 40 in the slot 41, the entire assembly of pin 40 and dog clutch element 42, however, being constrained to rotate with the shaft 22. Floatingly mounted on the shaft 22 is a dog clutch element 43 arranged to be engageable by the clutch element 42. Integral with the clutch element 43 is a plate member 44 extending outwardly toward the periphery of the left rim of the spool 20. Mounted on the plate member 44 and near its periphery is a plurality of driving pins 45 disposed around the edge of the plate member 44. Preferably a large number of driving pins 45 are thus provided, for example, ten or more. Fig. 4 is a cross-sectional view showing the dog clutch element 43, the plate member 44 integral therewith, and the driving pins 45 in greater detail.

A series of thin annular friction discs 46 are mounted on the driving pins 45 in such a fashion as to be axially movable with respect to the pins 45 and to be positively rotatable thereby in response to rotation of the plate member 44. Near the periphery of the left flange of the spool 20, as shown in Fig. 1, is fixed a plurality of driven pins 47 carrying thereon driven friction discs 48 which are free to move axially with respect to the pins 47 but which are angularly fixed by these pins 47 so that the driven friction discs 48 are integrally rotatable with the spool 20. The friction discs 48 are likewise annular and of such dimension as to slightly overlap in their inner extensions the outer extensions of the annular friction discs 46, and the annular discs 46, 48 are so disposed that in this region of overlap there is a successive alternation of driving discs 46 and driven discs 48, each driving disc 46 having its outer edge disposed between two driven discs 48, and each driven disc 48 having its inner edge disposed between two driving discs 46.

Figure 7:
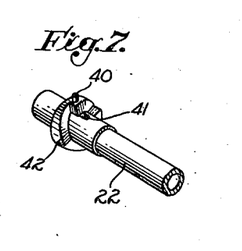
Fig. 7 is a perspective view showing detail of Fig. 1 and illustrating the free spool clutch element associated with the main driving shaft.

Of the members thus far described, the jaw toothed clutch constituted by the clutch elements 42 and 43 forms a free spool clutch which in non-engaged condition permits free rotation of the spool 20, and the friction discs 46, 48 and their mountings constitute the drag by which any desired degree of frictional restraint may be placed on the rotation of the spool 20. These elements are operatively actuated by a controlled movement of the main shaft bearing 49 to the right, as shown in Fig. 1, or toward the spool member 20. Without for the moment going into the details of how this controlled motion is produced, the actuating effect thereof on the free spool clutch 42, 43 and friction drag 46, 48 may be followed through. When the main shaft bearing 49 is fully retracted, that is, withdrawn to the position shown in Fig. 1, the jaw clutch 42, 43 is held open by the action of a disengaging spring 50 positioned within the hollow main shaft 22, the reaction of one end of the spring 50 being taken up by the shaft 22 by means of retaining pin 51. The other end of the disengaging spring 50 bears on the main driving pin 40 and holds it and the clutch element 42 attached thereto in a position determined by the left-hand termination of the slot 41, as is best shown in Fig. 7. With the clutch element 42 thus disposed, it is free from the influence of its mating element 43, and the spool 20 is thereby free to rotate, or is in free-spool condition.

The motion of the main shaft bearing 49 toward the clutch assembly 42, 43 is best transmitted through a resilient member such as a spring 52 in order to avoid possible blocking by dead-ending of the clutch teeth. Other means, however, may be used for transmitting the motion of the main bearing 49 to the engaging element 42 of the clutch, it being understood, however, that such motion should be effectively transmitted to engage the clutch 42, 43 before the advancing bearing 49 becomes operative in transmitting thrust to the friction discs 46, 48, as hereinafter discussed. As illustrated in the drawings, the advancing motion of the bearing 49 is transmitted through the spring 52, and when the compression of the latter becomes such as to exceed the disengaging force of the internal spring 50, the clutch member 42 is moved into engagement with the clutch member 43, the slot 41 providing freedom for the necessary axial travel of the main driving pin 40. The free spool clutch 42, 43 having thus been engaged, a drive is available through the friction disc assembly 46, 48. The amount of torque transmittable through this assembly 46, 48, however, is very slight in the absence of any compressive force on the assembly 46, 48. We provide for the application of such compressive force subsequent to the engagement of the free spool clutch 42, 43 by the use of pressure transmitting mechanism substantially non-operative until the main shaft bearing 49 has advanced sufficiently to engage the free spool clutch 42, 43, and operative thereafter to transmit pressure arising from further advancement of the main shaft bearing 49 to actuate the friction disc assembly 46, 48 and compress it to any desired degree. Such a mechanism is illustrated in Fig. 1 and comprises a pressure sleeve 53 mounted around the free spool clutch assembly 42, 43 and axially movable with respect thereto and comprising a thrust ring 54 adapted to engage the face of the main shaft bearing 49 when the latter has moved to or beyond its clutch engaging position and to receive the compressive force arising from further advancement of the main shaft bearing 49, and a thrust plate 55 integral with the pressure sleeve 53 adapted to transmit said pressure to the plate member 44. Thus, continuing advancement of the main shaft bearing 49 subsequent to the engagement of the free spool clutch 42, 43 results in the application of increasing pressure to the plate member 44, which in turn transmits the pressure through the friction disc assembly 46, 48 to the periphery of the left edge of the spool 20. The thrust is eventually taken up by thrust bearings disposed between the right-hand side of the spool 20 and the casing 30. The frictional drag between the driving and driven discs 46, 48 may thus be increased to any desired degree according to the compressive force on the friction disc assembly 46, 48.

Rotation of the driving handle 21 is thus effective in transmitting torque through the channels that we have already discussed to the main shaft 22 and thence through the main driving pin 40 and clutch elements 42 and 43, plate member 44, and the friction discs 46 and 48, being ultimately transmitted to the periphery of the left edge of the spool 20 through the pins 47. By suitable adjustment of the compressive force on the friction disc assembly 46, 48, the torque thus transmissible to the spool 20 may be limited to any desired value by permitting slipping in the friction disc assembly 46, 48.

Figure 5:
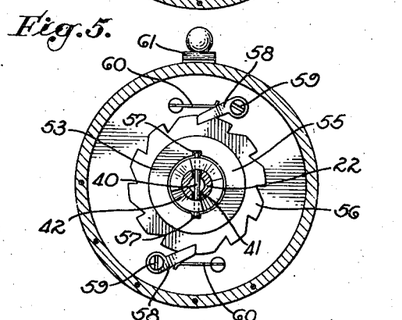
Fig. 5 is a cross-sectional view taken as indicated by the line 5—5 of Fig. 1 and illustrates the spool ratchet.

Excessive torque may also arise from the action of the load, in which case the reel tends to unwind and pay out line. By ratcheting against reverse rotation of the pressure sleeve 53, the friction disc assembly 46, 48 may effectively act as a drag upon the spool 20 whereby through means such as presently described any desired degree of frictional resistance to expenditure of line may be brought into play. We usually prefer to provide ratchet means disposed in proximity to the friction disc assembly 46, 48 whereby a transmission of the load strain throughout the entire driving mechanism is avoided. In the assembly shown in Fig. 1, a ratchet gear 56 is rigidly mounted on the pressure sleeve 53, and the entire assembly is rotatably fixed to the main shaft 22, by prolongation of the main driving pin 40 to engage in a slot 57 in the pressure sleeve 53, said slot 57 being best seen by reference to Fig. 5. The periphery of the ratchet gear 56 is provided with teeth adapted to suitably engage with a ratchet pawl 58, the latter being mounted pivotally on a pin 59 fixed in the case 30 and held in operative position by means of a pawl spring 60 fixed to the case 30 and reacting on the pawl 58. The disposition of the pawl 58 is such as to prevent unwinding of the spool 20 or rather to take up the torque transmitted through the friction disc assembly 46, 48 when the spool 20 tends to unwind or does unwind, such disposition of the pawl 58 being permissive of the winding drive arising from the normal rotation of the handle 21. To recapitulate, torque occasioned by the forcible unwinding of the reel spool 20 is transmitted through the friction disc assembly 46, 48, the plate member 44, the free spool clutch elements 42 and 43, the main driving pin 40, the pressure sleeve 53 in which the aforesaid pin 40 is engaged, the ratchet gear 56, and is finally absorbed through the ratchet pawl 58 and its pin 59 by the case 30.

We turn now to the actuating means for progressively actuating, first, the engagement of the free spool clutch 42, 43, and second the friction disc assembly 46, 48. It is one of the objects of our invention to provide a unitary control structure preferably in a form including a member external to the case adapted in one arcuate motion of the control to engage a free spool and to progressively apply greater frictional drag thereon, and in the reverse motion to progressively decrease the drag on the spool and to ultimately dispose the reel in free spool condition.

In the embodiment shown in Fig. 1, the unitary drag and free spool control comprises a lever 61 fixed to a screw member 62 having threads engaging with a threaded bore in the casing 30 whereby an arcuate motion of the control lever 61 results in axial displacement of the screw member 62 due to the interaction of the threads on said member 62 with the threaded bore in the case 30. The screw member 62 projects inwardly to contact the main shaft bearing 49 whereby the axial displacement of the screw member 62 with respect to the case 30 is effective in axially displacing the main shaft bearing 49. The main shaft bearing 49 is thus positively advanced as the screw member 62 feeds into the case 30. When the screw member 62 is retracted by an opposite motion of the control lever 61, the main shaft bearing 49 is constrained to follow it by the expansive action of the spring 52.

Figure 6:
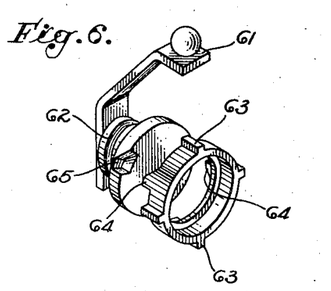
Fig. 6 is a perspective view showing detail of Fig. 1 and illustrating the unitary free spool and drag control mechanism.

Since the initial movement of the control lever 61 away from a free-spooling position has as its first desired function the engagement of the free spool clutch 42, 43, which engagement may require substantial axial motion as contrasted with the very small degree of axial motion subsequently necessary for compression of the friction disc assembly 46, 48, we have provided for an initially rapid and subsequently slow response of the main shaft bearing 49 to the progressive motion of the control lever 61. This is accomplished by splining the outer sleeve of the main shaft bearing 49 to the case 30 to prevent rotation of the outer sleeve, spline members 63 being discernible in Fig. 1 and being better seen in the perspective drawing of Fig. 6. The outer sleeve of the bearing 49 is thus non-rotatable with respect to the casing 30, which permits the introduction of suitable cam action between the rotatable screw member 62 and the non-rotating sleeve of the main shaft bearing 49. Such cam action is provided by supplying the outer sleeve of the bearing 49 with beveled fingers 64, as shown in Fig. 1 and in Fig. 6. The screw member 62 carries recesses 65 placed to be in apposition with and to receive the beveled fingers 64 when the control lever 61 is at free-spool setting. The corresponding position of the control lever 61 may, if desired, be provided with a stop as marking the free-spool position. On the advancement of the lever 61 from this position, the screw member 62 both rotates and screws into the case 30. The initial rotation of this member 62, however, serves to remove the recesses 65 from apposition to the beveled fingers 64, the latter thereby being constrained to mount up on the unrecessed portions of the inner surface of the member 62. Thus, during the initial motion of the lever 61, the main shaft bearing 49 is very rapidly advanced by the combined effect of the thread progression of the member 62 and the cam action of the beveled fingers 64. This serves to produce sufficient axial displacement of the main shaft bearing 49 to engage the free spool clutch 42, 43 and to bring the main shaft bearing 49 into contact with the thrust ring 54. Further motion of the control lever 61 in the same direction produces only slow axial progression arising from the screw relationship of the member 62 and the casing 30. This slow motion permits pressure to be applied to the pressure sleeve 53 and to the friction disc assembly 46, 48 with a high degree of mechanical advantage. The high pressures developed when the lever 61 is at a position corresponding to the maximum desired drag are taken up practically entirely by the pressure sleeve 53 and the friction disc assembly 46, 48, the free spool clutch 42, 43 being relieved of this pressure due to the fact that the spring 52 yields readily to the slight motions of the bearing 49 productive of such pressures in the friction disc assembly 46, 48 and also to the fact that the main driving pin 40 is connected to the pressure sleeve 53 only through the notch 57 which is permissive of relative axial displacement of the sleeve 53 and pin 40.

Figure 3:
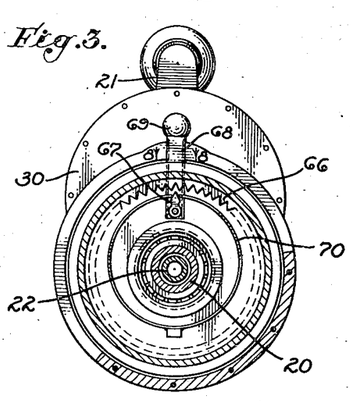
Fig. 3 is a cross-sectional view taken as indicated by the line 3—3 of Fig. 1, and illustrates the click mechanism and control therefor.
Figure 8:
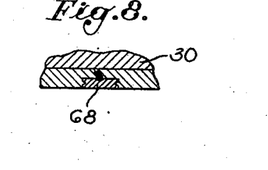
Fig. 8 is a cross-sectional view of a portion of Fig. 3 taken as indicated by the line 8—8.

Within the opposite or right-hand side of the spool 20 is disposed a click mechanism which comprises an internally roughened or toothed click ring 66 and a spring-controlled click ratchet 67 best seen in Fig. 3, the ring 66 being fixed to the spool 20 and the ratchet 67 being mounted on a shaft 68 which is slidably movable with respect to the case 30 but keyed thereto as is best seen in Fig. 8. The shaft 68 extends externally of the case 30 and terminates in a click knob 69. The shaft and ratchet assembly 68, 67 are so disposed relative to the click ring 66 that the ratchet 67 is brought under the influence of the click ring 66 only when the shaft 68 is pulled out. The construction is shown more clearly in the detailed Figure 3 which represents a cross-sectional view through the click ring 66 and facing the driving handle 21 of Fig. 1 and shows a conventional circular spring 70 for activating the click ratchet 67, the spring 70 being fixed to the case 30 at a point diametrically opposite the click mechanism. Fig. 3 shows the click ratchet 67 disengaged from the internal gear 66. Engagement is effected by the withdrawal of the click shaft 68 by means of the click knob 69 outwardly to operative position. On depressing the click knob 69 and shaft 68 inwardly, the ratchet 67 is again removed from contact with the click gear 66. The control mechanism is characterized by the fact that the click ratchet 67 is disengaged by simply depressing the control knob 69 inwardly, this being accomplished in the present instance by the use of an internal gear 66 as the click exciting mechanism. The feature of disengagement by depression of the control knob 69 is very convenient and advantageous in use.

Having thus described in detail the embodiments of our invention illustrated in Fig. 1, we shall proceed to discuss the underlying principles, particularly of the speed change mechanism, torque-responsive mechanism, the operative connections therebetween, the unitary drag and free spool control, the drag mechanism, and the click mechanism, illustrating these principles where necessary by reference to alternative structures.

In general we propose to use transmission mechanisms that are alternatively disposable in low and high speed drives, and to provide torque-responsive mechanisms operatively connected to selectively and automatically dispose the transmission mechanism in high or low speed drives in accordance with the torque or speed requirements. Our invention is also directed toward certain novel types of transmission devices disposable in two speeds, which are very advantageously adapted to cooperate with the torque-responsive control, but which in addition have novelty and utility in their own right.

Various speed change devices may be used in connection with our torque operated control, and in such a combination they may comprise a high speed drive means, a low speed drive means, means to engage operatively and selectively either the high speed means or the low speed means in driving relationship, and means responsive to the torque to control the selective engagement.

We prefer, however, to use speed change devices which are disposable in alternative speeds with a minimum amount of shifting and displacement of the elements, and we have developed for this purpose drives in which the high speed means includes a member engageable and disengageable to operatively connect and disconnect the high speed means in driving relationship, and in which the low speed drive means includes a ratchet means, or broadly any unidirectional integrating means, permissive of rotation arising when the high speed drive is engaged, and automatically providing operative engagement of the low speed drive means when the high speed drive means is disengaged and inoperative. The utility of such speed change devices is not necessarily restricted to their combination with a torque responsive control means for engaging or disengaging at the high speed drive, for such engagement may be effected manually or otherwise.

Figure 13:
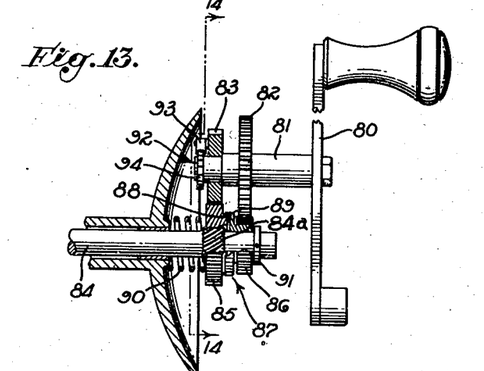
Fig. 13 is a partially sectional view of an alternative embodiment of our speed change device using spur gear and pinion gearing.
Figure 15:
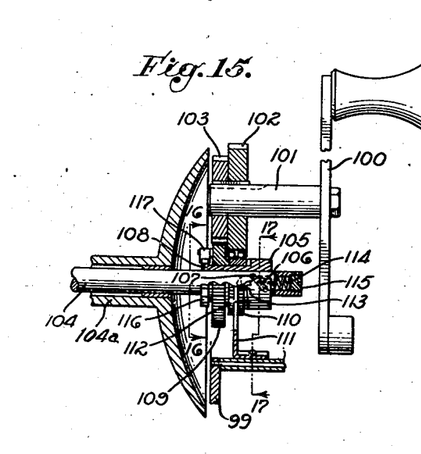
Fig. 15 is a partially sectional view of an alternative embodiment of our speed change device.
Figures 16, 17:
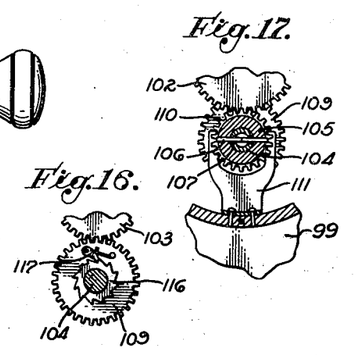
Fig. 16 is a cross-sectional view of Fig. 15 taken as indicated by the line 16—16.
Fig. 17 is a cross-sectional view of Fig. 15 taken as indicated by the line 17—17.

While the epicyclic train illustrated in Fig. 1 is of this type, the relationship is perhaps clearer in the case of gear and pinion trains, such as those illustrated in Figs. 13 and 15. In Fig. 13 the handle 80 rotates a driving shaft 81 having a large gear 82 fixed thereon and a small gear 83 floatingly mounted thereon and restrained from lateral displacement as by a collar. The shaft 81 may be suitably journaled in a case (not shown). A driven shaft 84 carries a large gear 85 internally spirally splined to the spiral splines 84a on the shaft 84 and a small gear 86 floatingly journalled thereon. A clutch assembly 87 is provided between gears 85 and 86, and comprises a clutch element 88 integral with the gear 85 and matingly disposed with respect to a clutch element 89 integral with the gear 86. The clutch assembly 87 is held engaged under light loads by the compression of a spring 90, the spiral splines 84a permitting the transmission of the spring pressure to the clutch element 88. The pressure of the spring 90 is taken up by the clutch element 89, the gear 86, and a thrust collar 91 keyed to the shaft 84.

Figure 14:
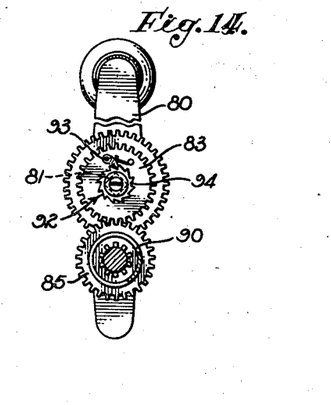
Fig. 14 is a cross-sectional view of Fig. 13 taken as indicated by the line 14—14.

The low speed drive means comprises gears 83 and 85, and a ratchet means 92 is disposed in this drive means between the shaft 81 and the gear 83. The ratchet means 92 is best seen in Fig. 14 and comprises a spring actuated pawl 93 pivotally mounted on the gear 83 and a ratchet gear 94 keyed to the shaft 81 and having teeth in engagement with the pawl 93. The pawl 93 is arranged to be permissive of rotation arising when the high speed drive is operative through the engagement of the clutch 87; i. e., permissive of the gear 83 overrunning the shaft 81.

Under conditions of heavy load, an end thrust is developed by the spiral splining 84a between the gear 85 and the driven shaft 84 sufficient to overcome the compression of the spring 90 and disengage the clutch 87. At the beginning of disengagement some slipping may occur, sufficient to reduce the speed of the gear 83 to that of the driving shaft 81. At this point and thereafter, as long as the heavy load continues, the ratchet means 92 serves as a positive driving connection whereby the low speed driving means 83, 85 is operatively connected to transmit torque from the driving shaft 81 to driven shaft 84. Upon reduction of the load, the reduced torque transmitted through the spiral splines 84a results in a decrease of end thrust sufficient that the spring 90 again becomes controlling.

A somewhat similar modification is shown in Fig. 15. In this instance a driving handle 100 rotates a driving shaft 101 having keyed thereon a large spur gear 102 and a small spur gear 103. On the driven shaft 104 is carried a collar 105 which is constrained to move spirally with respect to shaft 104 by means of a pin 106 fixed in the collar 105 and engaging an oblique slot 107 in the shaft 104. The collar 105 is continued at one side to form a sleeve 108 which is journalled on the main shaft 104 and in turn serves as a journal for a large spur gear 109, which engages the gear 103, and a small spur gear 110, which engages the gear 102. The face of the gear 110 is recessed in part to receive a fork 111 attached to the case 99 and preventing substantial axial displacement of the gear 110. Integral with the side of the gear 110 is a clutch element 112 provided with chamfered dog teeth. This element 112 faces the collar 105 and the neighboring side of the collar 105 is provided with an integral clutch element 113 adapted to mate with the clutch element 112. The projecting end of the shaft 104 is hollowed and provided with a spring 114 put in compression by means of an adjusting screw 115 and bearing against the pin 106. Compression of the spring 114 tends to force the collar 105 to move into engagement through the clutch elements 112 and 113 with the gear 110.

The end of the sleeve 108 opposite the collar 105 terminates in a ratchet gear 116, the teeth of which engage a pawl 117 pivotally mounted on the gear 109. The pawl 117 is spring actuated and so disposed that it is permissive of the overrunning of the sleeve 108 relative to the gear 109 when the clutch elements 112 and 113 are engaged to provide a high speed drive. When the clutch elements 112 and 113 are disengaged the pawl 117 prevents overrunning of the gear 109 relative to sleeve 108 and thus provides for positive transmission of torque through the low speed gear train comprising gears 103, 109.

Under low load conditions, that is, when the torque transmitted to the shaft 104 by means of the pin 106 is relatively low, the compression of spring 114 is the controlling factor and the clutch elements 112, 113 are kept engaged to provide a high speed drive. When the torque is increased to the extent that the end thrust produced by the action of the pin 106 on the oblique sides of the slot 107 exceeds the compressive force of the spring 114, the pin 106, together with the collar 105 and sleeve 108 integral therewith, are moved axially to the right, disengaging the clutch 112, 113. Axial motion of the gear 110 is effectively prevented as hereinbefore described by means of the fork 111. With the clutch 112, 113 thus disengaged the ratchet gear 116 and pawl 117 are brought into play as soon as the gear 109 tends to over-run the sleeve 108, and thereafter and as long as the torque continues to be of sufficient magnitude to maintain the clutch elements 112 and 113 disengaged, a positive low speed drive is provided through the ratchet means 116 and 117.

In the mechanisms illustrated in Fig. 13 and Fig. 15 the high speed means 102, 110 including clutch means 112, 113, and the low speed means 103, 109, including ratchet means 116, 117, though constituted by separate gear trains, coalesce in a common driven element 106 transmitting torque to the driven shaft 104 and forming part of the torque responsive device so that the latter is maintained responsive to the torque transmitted by either gear train.

The high and low speed means illustrated in Fig. 1 may also be regarded as constituting separate means with the high speed means associated with engageable holding means 29, 29a and the low speed means associated with ratchet means 38 although in the epicyclic train illustrated the elements of the two speed means are the same and its alternative disposition as two different speed means is effected by alternative dispositions of the floating member 26 of the epicyclic. When the floating member or the ring gear 26, as illustrated in Fig. 1, is engaged and held to the case 30 the high speed means comprises the planet carrier 23 and the planet gears 24 which are reacted upon by the stationary ring gear 26 to increase their speed of rotation, this increased speed being transmitted to the driven sun gear 27. When the engageable holding means 29, 29a is disengaged so that the floating member or ring gear 26 is free to rotate but prevented from over-running the planet carrier 23 by the described ratcheting means 38, a low speed or direct drive is obtained in which the gears cease functioning as gears and the epicyclic is integrated as a unit. This is in effect the equivalent to ratcheting between the driving shaft 23 and the driven shaft 28 but with the ratchets 38 disposed as illustrated the torque is transmitted through the planet gears 24, which no longer rotate on their pins 25, directly to the sun gear 27. It is thus seen that the epicyclic gearing provides a high speed means including engageable holding means and a low speed means including ratchet means.

Our principle of ratcheting is applicable to epicyclics generally in which one speed corresponds to a direct drive; that is, to an integrated epicyclic, but the ratcheting means are differently disposable according to whether the second drive is an over-drive or an under-drive; that is to say, according to whether the driven shaft is driven faster or slower than the driving shaft under the disposition alternative to the direct drive.

It is well to understand that an epicyclic train necessarily comprises at least three elements, two of which may be coaxial gears, the third element being constituted by an orbitally movable member carrying planet gears enmeshed with the other two elements. When any two of these elements are taken as driving and driven elements respectively, torque transmission is impossible unless the third or floating member is restrained in its free rotation as by holding it against rotation. When the sizes and dispositions of the gears are such that the holding of the floating member against rotation results in an over-drive of the driven element it is demonstrable that upon release of the floating member it is accelerated in the direction of rotation of the driving and driven elements, it being understood that we refer to an epicyclic which is not arranged as a reversing drive but in which both the driving and driven elements are rotating in the same direction, and in which the power in the driving element is resisted by a load in the driven element. Under these conditions the release of the floating member inherently results in the floating member shortly attaining the same speed as the driving member and, indeed, surpassing the speed of the latter if permitted to do so. By the use of ratchet means which prevent the floating member from over-running the driving member, the floating member may again be brought into restraint, this time, however, in such a fashion as to revolve integrally with the driving member, the tendency of the floating member being to over-run the driving member and such tendency being effectually opposed by the ratchet means. The drive obtained under these latter conditions is a direct drive, the epicyclic train rotating as a unit without differential motion of its elements and being in effect integrated by the action of the ratchet means. Since this condition of direct drive is one characterized by the absence of relative motion between any of the epicyclic parts, ratchet means may be effectively disposed between any of the elements provided that they are permissive of the over-running of the driving and driven elements relative to the floating element when the latter is restrained from rotation. Thus the ratchet means may be interposed between the floating member and the driving member to prevent the floating member from over-running the driving member, or they may be interposed between the floating member and the driven member to prevent the floating member from over-running the driven member, or they may also be disposed directly between the driving member and driven member so as to provide a direct drive directly through the ratchet means when the floating member is released and to permit the over-running of the driven member relative to the driving member when the epicyclic is disposed in over-driving relationship by fixing the floating member. Various other dispositions of the ratcheting means may also be advantageously used, for example, the planet gears may be undirectionally ratcheted on the planet carrier by the use of a ratchet means or an over-running clutch adapted to prevent the reversal of rotation of the planet gears which would otherwise ensue when the floating member exceeded the speed of the driving member and thereby to integrate the epicyclic as previously described.

The mechanism shown in Fig. 1 is of the type described in that it supplies the over-drive when the floating member or ring gear 26 is restrained from rotation by the engageable holding means 29, 29a and, on the other hand, provides a direct drive or integrated epicyclic train through the use of ratchet means 38 when the floating member 26 is released from restraint by disengagement of the holding means 29, 29a.

Figure 18:
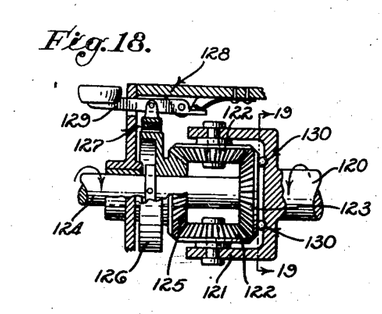
Fig. 18 is a partially sectioned view of ratcheted epicyclic gearing embodying our invention.

Fig. 18 is illustrative of a bevel gear type epicyclic train adapted according to our invention to give over-drive when the floating element is fixed against rotation and adapted to automatically change to a condition of integrality or direct drive maintained by a ratchet means when the clutch means is disengaged.

Figure 19:
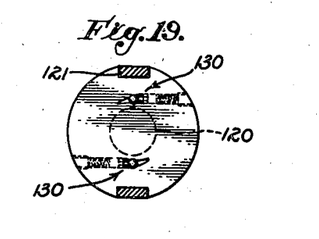
Fig. 19 is a cross section of Fig. 18 taken as indicated by the line 19—19.

Referring to Fig. 18, a drive shaft 120 rotates in the direction indicated by the arrow. Integral with the drive shaft 120 is a planet carrying sleeve 121 on which are pivotally mounted beveled planet gears 122. The planet gears 122 are simultaneously enmeshed with a bevel gear 123 integral with the drive shaft 124 and a floating bevel gear 125 floatingly journalled on the shaft 124. Integrally mounted on the gear 125 is a brake drum 126 adapted to be frictionally engaged by a brake shoe assembly 127 pivotally mounted on the casing 128 and controlled by lever 129 so that by suitable disposition of the control lever 129 the gear 125 may be braked to prevent its rotation or may be freed from restraint to permit its rotation relative to the casing 128. When the floating gear 125 is held fixed against rotation by means of the brake assembly 127 the driven shaft 124 is driven in the same direction as the driving shaft 120 and at twice the speed. On release of the gear 125 the driven shaft 124 decelerates until its speed becomes the same as that of the driving shaft 120. Its further deceleration relative to the driving shaft 120 is prevented by ball ratchet means 130, best seen in Fig. 19, placed between the ends of the driving and driven shafts 120, 124 whereby the driven shaft 124 is ratchetedly permitted to over-run the driving shaft 120 but the driving shaft 120 is prevented from over-running the driven shaft 124. The direct drive obtained through the action of the ratchet means 130 when the gear 125 is released and permitted to rotate results in effective integration of the epicyclic train so that all parts thereof revolve at equal angular speeds around the axis defined by the shafts 120 and 124. Obviously, the ratchet means 130 could have been placed between any of the coaxially rotating elements of the train; for example, between the floating gear 125 and the driven shaft 124. If desired, the disposition of the lever 129 may be made responsive to the torque in the shaft 124 or it may be manually or otherwise controlled.

Figure 20:
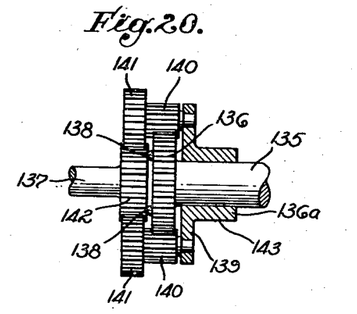
Fig. 20 is a partially sectional view of an alternative ratcheted epicyclic gear train.

Referring to Fig. 20 which is also illustrative of an epicyclic disposable as an over-drive, a driving shaft 135 terminates in a large spur gear 136 and is in alignment with a driven shaft 137 terminating in a smaller spur gear 142. Floatingly journalled on the shaft 135 is a planet carrier member 139 on which are pivotally mounted planet gears 140 and 141. These two planet gears 140, 141 are formed integrally so that they rotate as one. The portion of the planet carrier 139 which is journalled on the shaft 135 has a sleeve extension 136a providing an annular braking surface 143 and adapted to be engaged by clutching means, not shown, so as to be fixable against rotation.

A ball ratchet means 138 is provided between the gears 136 and 142. The over-drive is set in operation by the clutching of the surface 143 whereby the planet carrier member 139 and the planet gears 140, 141 mounted thereon are prevented from revolving around the shafts 135 and 137. Under these conditions the driven shaft 137 is rotated in the same direction as and faster than the driving shaft 135. Upon release of the braking means on the surface 143 the floating member, which in this instance is the planet carrier 139, begins to revolve and the speed of the driven shaft 137 is correspondingly reduced. When the speed of the latter equals that of the driving shaft 135 direct drive is provided by the ball ratchet means 138 and under these conditions the entire epicyclic train revolves as an integrated unit. The epicyclic train illustrated in Fig. 20 could also be integrated by a different disposition of the ratcheting means, for example, by the disposition of the ratcheting means as an over-running clutch between the drive shaft 135 and the planet carrier sleeve 136a permissive of the relative rotation arising when the sleeve 136a is fixed against rotation but preventing the planet carrier 139 over-running the shaft 135 when released.

When the relative sizes and dispositions of the epicyclic elements are such that the fixing of the floating element against rotation results in the driven element being driven in the same direction as but slower than the driving element it is demonstrable that the release of the floating element results in its acceleration in a direction away from integrality with the rest of the epicyclic system. The use of ratchet means to integrate the epicyclic on release of the floating member would under these conditions be without effect and it becomes necessary to provide a clutch or other engageable means to integrate the epicyclic in a direct drive. It will be noted, however, that the clutch means is thus engageable as in the previous modifications to dispose the epicyclic train in the higher of its two available speeds. Moreover, the tendency of the floating element to assume a reversed rotation relative to the driving element under these conditions permits it to be effectively restrained for purposes of the low speed drive by means of a ratchet interposed between the floating element and some fixed and non-rotating structure, such as a member associated with the casing, so that the low speed drive means is associated with a ratchet means as in previous modifications.

Figures 22, 23:
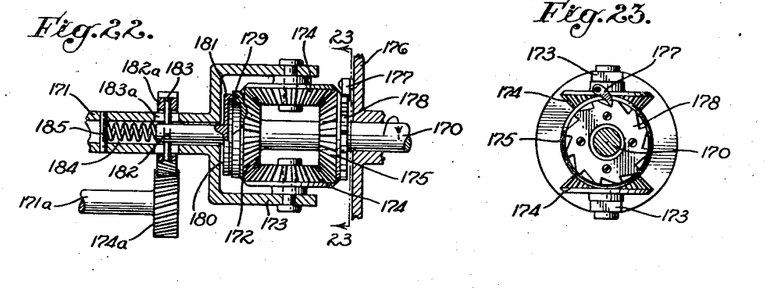
Fig. 22 is a partially sectional view of an alternative arrangement of ratcheted epicyclic gearing.
Fig. 23 is a cross section of Fig. 22 taken as indicated by the line 23—23.

The principles here involved are illustrated in Fig. 22 in which 170 is a driving shaft and 171 is a driven shaft. It may be noted that the essential gear trans involved in Fig. 22 are those in Fig. 18 with the role of driving and driven shafts reversed so that when the floating member is restrained against rotation the driven shaft assumes a slower speed than the driving shaft. More particularly, a bevel gear 172 is mounted integrally on the end of the driving shaft 170, and integral with the driven shaft 171 is a planet carrier sleeve 173 having pivotally mounted thereon the planet gears 174. The floating member is constituted by a gear 175 floatingly journalled on the shaft 170 and enmeshed with the bevel gears 174 as is also the bevel gear 172. The rotation of the driven shaft 170 tends to rotate the floating member 175 in the opposite direction. This reversed motion of the floating member 175, however, is prevented by ratcheting to the casing 176, the ratcheting means comprising a pawl 177 pivotally mounted on the casing and engaging a ratchet gear 178 integral with the bevel gear 175, this construction being best seen in Fig. 23. The reversed rotation of the floating member 175 being thus restrained, the driven shaft 171 is rotated in the same direction as and at half the speed of the driving shaft 170.

Means for integrating the transmission in direct drive relationship may be provided by a clutch means disposed between any coaxially rotatable elements. In the drawing the integrating means comprises an annular groove 179 on one side of the gear 172, a thrust plate 180 carrying an annular ridge 181 arranged to engage with the groove 179, and a member 182 integral with the thrust plate 180 and fitting in the hollowed interior of the shaft 171 and having a pin member 183 projecting through a longitudinal slot 183a in the side of the hollow shaft 171 by means of which the clutch element 181 may be moved to and from an engaging relationship with the clutch element 179. A spring 184, held under compression by means of a pin 185 and abutting against the end of the member 182, serves to hold the clutch 181, 179 normally in engaged condition. By moving the member 183 along the longitudinal slot 183a against the compression of the spring 184, the clutch assembly 181, 179 may be released and such motion of the member 183 may be suitably controlled by a torque responsive means. For example, as illustrated, the projecting ends of the pin 183 are fixed in a spiral gear 182a slidably mounted on the shaft 171 and engaging a spiral gear 174a integral with a shaft 171a connected to load elements not shown. The end thrust of the spiral gears 182a, 174a acting against the spring 184 causes the pin 183 to assume opposite terminal positions in the slot 183a when the load reactance is low and high respectively.

With the clutch 181, 179 engaged, the torque is transmitted through the clutch elements 181, 179 and member 182 to the pin member 183a and thence to the spiral gears 182a, 174a. When the clutch 181, 179 is released by suitable disposition of member 183 the condition of under-drive above noted takes place and torque is transmitted through the shaft 171 to the pin 183 and thence to the spiral gears 182a, 174a. When the clutch 181, 179 is again engaged direct drive is reestablished. It will be noted that under the conditions of direct drive the entire epicyclic assembly revolves as a unit and is in fact effectively integrated against differential rotation. It will further be noted that the rotation of the floating gear 175 under these conditions of integration arising during high drive is in the same direction and at the same speed as the rotation of the driving shaft 170, this direction of rotation being permitted by the ratchet means comprising the ratchet gear 178 and pawl 177.

While the disposition of the clutch or holding element and ratchet element is different according to whether the epicyclic train is disposable as an over-drive or as an under-drive relative to the direct drive arising with the integrated epicyclic, the relationship of the clutch or holding means and ratchet to the high and low speed means remains the same as in the previous instances; that is, the high speed means includes a clutch or holding element engageable to dispose the transmission in high speed relationship while the low speed means comprises a ratchet means permissive of the rotation arising during the high speed drive but preventing the unrestrained rotation of the floating element when the low speed drive is operative.

It may accordingly be noted that in all instances, including non-epicyclic trains and various types of epicyclic trains, our speed change mechanism comprises a high speed means including a member engageable to operatively dispose the high speed means in driving relationship, and a low speed means associated with ratchet means permissive of relative rotation arising during the high speed drive but operative to dispose the low speed means in driving relationship when the high speed means is inoperative.

While in most instances we prefer to use friction clutches as the engageable elements in the high speed means because of the smoothness of their engagement and because the tendency toward slipping is only very slight under the low torque transmitted at high speed, any member which is engageable and disengageable to operatively connect and disconnect the high speed means to and from driving relationship may be used, such as a jaw tooth clutch as illustrated in Fig. 15, or any frictionally engaging member, or a gear slidable to and from engagement with a mating gear.

Figure 9:
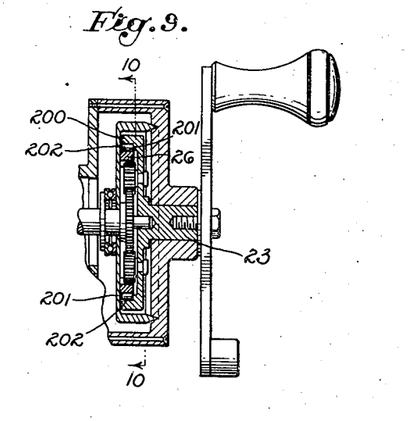
Fig. 9 is a sectional view of ratcheted gearing alternative to that shown in Fig. 1.
Figure 10:
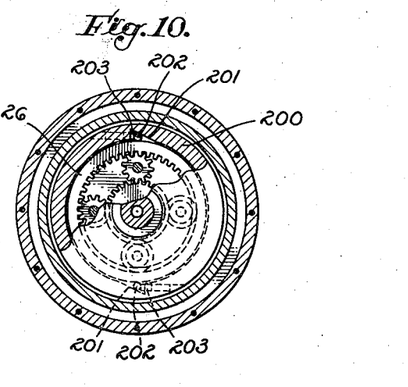
Fig. 10 is a cross-sectional view of Fig. 9 taken as indicated by the line 10—10.

The ratchet means associated with the low speed drive means may comprise any suitable means permissive of relative motion in one direction and preventing relative motion in the other direction. Such unidirectional means may comprise a pawl mounted on one of two elements it is desired to ratchetedly connect, a ratchet gear being mounted on the second. The unidirectional means may also comprise various types of overrunning clutches of the roller, ball, or spring type. Figs. 9 and 10 are illustrative of a roller clutch modification of the ratcheted epicyclic shown in Figs. 1 and 2. Referring to Figs. 9 and 10, the planet carrier 23 has been provided with an extension including an overhanging flange 200 disposed as a loose sleeve around the internal ring gear 26. The inner surface of the flange 200 is provided with a pluraltiy of recessed ramps 201 carrying rollers 202. The rollers 202 are predisposed to climb the ramp 201 by means of a spring loaded piston 203, and thus kept in contact with the outer surface of the ring gear 26 and responsive to the rotation thereof. When the ring gear 26 is restrained from motion, the clockwise rotation of the flange 200 frees the rollers 202 and permits relative motion of the flange 200 and ring gear 26. When the ring gear 26 is released it tends to accelerate in a clockwise direction past the rotating flange 200, but is prevented from overrunning the latter by the fact that such motion relative to the flange 200 rolls the rollers 202 up the ramp 201 to provide an effective jam or lock between the flange 200 and ring gear 26. These elements are thus effectively ratcheted in accordance with the meaning of the term as used in this specification and appended claims.

The function of the ratchet means in integrating an epicyclic train adapted for over drive and direct drive has already been adverted to, but it may be further pointed out that such integration may provide a direct drive directly by interposition of the ratchet means between driving and driven elements as in Figs. 18 and 20, or indirectly by ratcheting epicyclic elements to prevent such relative rotation as would ensue if the driven element were to under-run the driving element as in Figs. 2 and 9.

Figure 24:
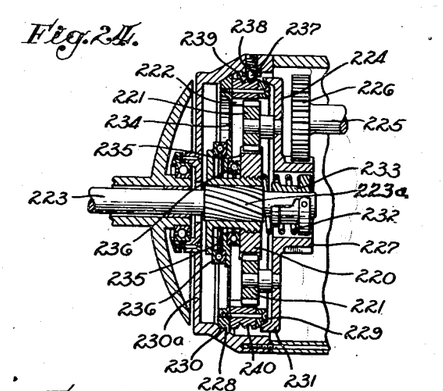
Fig. 24 is a partially sectional view of an alternative modification of our torque responsive change speed device.

In some instances the low speed means may be operatively connected by the engagement of an engageable means such as a clutch rather than by the automatic action of ratchet means, the torque responsive means being arranged to control the engagement of the low speed clutch as well as that of the high speed clutch holding elements. Such practice may sometimes be advantageously used in light mechanism, and is illustrated in Fig. 24. In this figure an epicyclic gear train is illustrated comprising a sun gear 220, planet gears 221 and an outer ring gear 222.

The sun gear 220 is fixed to a driven shaft 223, the ring gear 222 is floating, and the planet gears 221 are carried by a flange 224 arranged to be driven by the driving shaft 225 thru a gear 226 keyed to the shaft 225 and a gear 227 made integral with the flange 224 and mating with the gear 226. The ring gear 222 is provided with conical holding element 228 and clutch element 229, the former adapted to engage a holding element 230 fixed to the casing 230a, and the latter being adapted to engage a clutch element 231 integral with the flange 224. The ring gear 222 is axially displaceable to alternatively engage either the case 230a or the flange 224 through the corresponding holding or clutch elements 228 or 229, the flange 224 being suitably journalled by means not shown to prevent its axial displacement.

Axial movement of the ring gear 222 in response to change of torque is provided by spirally splining the sun gear 220 on the driven shaft 223 to develop an end thrust which is overcome by a spring 232 unless excessive, in which latter instance the sun gear 220 is axially displaced relatively to the shaft 223 and compresses the spring 232 until stopped by a shoulder 233, and by providing resilient means constraining the ring gear 222 to follow the axial displacement of the sun gear 220, such means including a resilient flange 234 integral with the ring gear 222 and extending inwardly as a yoke collared in a groove having side walls 235 integral with sun gear 220 and provided with anti-friction means such as thrust bearings 236. When the torque transmitted through the spiral splines 223a is low, the spring 232 is controlling and causes the holding elements 228 and 230 to engage and fix the ring gear 222 against rotation, thereby over-driving the driven shaft 223. When the torque transmitted is high the end thrust of the splines 223a is controlling and causes the engagement of clutch elements 229 and 231, thereby integrating the epicyclic train and providing a direct drive.

It is advisable to provide only slight clearance between disengaged holding and clutch elements so that one may be engaged immediately the other is disengaged, and in practice it is best to provide for a popping motion of the floating member 222 so that it moves immediately from one engagement to the other. A suitable mechanism for this purpose is a bullet latch, illustrated in Fig. 24 as a spring loaded ball 237 mounted in a recess 238 in the casing 230a and engaging alternatively annular grooves 239 and 240 in the outer face of the ring gear 222, the grooves 239, 240 being so disposed that their alternative engagement with the ball 237 corresponds to the alternative engagement of holding elements 228—230 or clutch elements 229—231. By imposing sufficient spring pressure on ball 237, the shift of the ring gear 222 to low speed position is restrained until more than sufficient strain has developed in the resilient flange 234 to cause the ring gear 222 to shift rapidly and completely to low speed position when the restraint of the bullet latch 237 is overcome. A similar popping action is obtained on returning to high speed drive.

Figure 21:
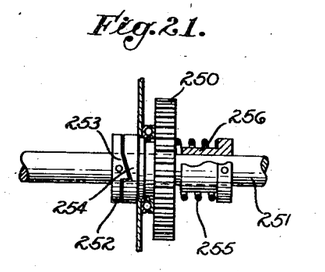
Fig. 21 is a partially sectional view of an alternative torque responsive mechanism.

While we contemplate broadly the use of any yieldable torque transmitting means to effect a shift from high to low gear when the transmitted torque exceeds a given value, we find it particularly advantageous to use thrust surfaces which are oblique to the axis of rotation for the transmission of torque, whereby axial thrust proportional to the transmitted torque is set up, and to provide resilient counteracting means adapted to substantially overcome such end thrust when the latter is low in magnitude, and to permit relative axial displacement of the thrust surfaces when the transmitted torque and axial thrust is high in magnitude. The counteracting means may suitably include a compressed spring, the pressure of which determines the point at which the mechanism will yield, i. e. undergo relative axial displacement. The thrust transmitting surfaces may be variously provided, for example, by means of oblique tooth or spiral gears, as shown in Figs. 1 and 22, or by means of spiral splines, as shown in Figs. 13 and 24, or by means of a pin engaged in a spiral slot, as shown in Fig. 15. A further modification is shown in Fig. 21, in which the end thrust is developed by the action of a cam. An energized gear 250 is floatingly journalled on a driven shaft 251. A collar 252 is keyed on the driven shaft 251 and is provided with a cam surface 253 on the side thereof. The gear 250 is provided with a sleeve 254 having a terminal portion adapted to contact the cam surface 253 and transmit the rotational thrust of the gear 250 thereto. Torque is thus transmitted from the gear 250 to the shaft 251, but an axial thrust proportional thereto is simultaneously developed by the obliquity of the cam surface 253. A compressed spring 255 is provided to counteract the axial thrust and prevent substantial axial displacement of the cam 253 and sleeve 254 when the axial thrust is less than the expansive force of the spring 255, such displacement arising, however, when the axial thrust exceeds the expansive force of the spring 255. The amount of axial displacement permissible may be suitably limited, as by a collar 256 on the shaft 251.

Figure 25:
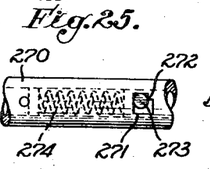
Figs. 25 and 25a are illustrative of alternative positions of one form of our torque responsive mechanism.
Figure 25A:
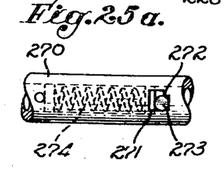

The cam surface 253 is shown as a spiral ramp of constant pitch. In some instances it is advantageous to provide a thrust surface of varying pitch, whereby an increasing proportion of the transmitted torque becomes available as axial thrust to overcome the increasing reactance of the spring as the latter is compressed by the axial displacement. This is of particular advantage when a substantial axial displacement is desired in response to a relatively slight increase in torque. Of particular advantage is a torque responsive device giving a sudden response as by a hinged pressure element in toggle relationship to a thrust element. A device giving this type of response is illustrated in Figs. 25 and 25a. A hollow driven shaft 270 is provided with a square slot 271 having a re-entrant corner 272. A similar slot is provided through the opposite wall of the shaft 270, but is not shown. A cylindrical driving pin 273 passes through the slots 271 and serves to impart torque to the shaft 270 from sources not shown, but which may be similar to the mechanism shown in Fig. 15. The edges of the re-entrant corner 272 extend inwardly a distance slightly less than the radius of the pin 273. The pin 273 is resiliently pressed toward the right-hand side of the slot 271 by means of a spring 274. When torque is transmitted through the pin 273, it is received by the re-entrant corner 272 which is slightly off center with regard to the pin 273 so that there is a thrust component tending to compress the spring 274. When this component exceeds the expansive force of the spring 274, the pin 273 tends to assume the position shown in 25, and in doing so the angular value of the spring-compressing component increases very rapidly, so that the shift is very abrupt and positive. The arrangement of the pin 273 and re-entrant corner 272 in 25 is likewise slightly off center, so that when the torque decreases sufficiently the spring 274 returns the pin 273 to the position shown in 25a, the return shift again being quite abrupt and positive.

Torque responsive devices of the kinds described are particularly adapted for the control of ratcheted multi-speed drives such as described herein, but if desired may be used to shift any conventional multi-speed transmission. While our torque responsive automatic speed change mechanism has been described with more particular reference to fishing reel drives, it is obviously adapted for advantageous application in many other types of drive, more particularly, in unidirectional multi-speed types of drives adapted to operate windlasses, hoists, and the like.

For example, our two-speed torque responsive transmission may be very advantageously incorporated in bicycle drives to provide an automatic low and high speed drive.

It should be obvious that our invention is not necessarily limited to two-speed power transmissions, though we have chosen to illustrate a preferred embodiment thereof in a fishing reel driving mechanism wherein two alternative speed ratios are sufficient. Successive additional reductions of speed may be arranged by providing ratchet means for each additional lower speed gear train permissive of over-running when the drive is through the relatively higher gear trains but preventive of under-running with respect to such ratcheted lower speed gear train, together with means to successively disengage the higher speed trains as the torque becomes progressively higher. In such a combination the torque responsive control means assumes intermediate stations corresponding to intermediate torques which it is desired to transmit through the intermediate gears. The shift from any gear train to the next lower gear train is completely analogous to the above described shifts in the two-speed mechanism. If desired, the torque responsive device may be stabilized in intermediate positions and also in its terminal positions by the use of bullet latches, or by providing notches or steps in the thrust and pressure elements. For example, the stepwise construction shown in Figs. 25 and 25a may be extended to provide as many steps as needed for shifting in the multi-speed transmission. In general it is desirable that all the gear trains coalesce, i. e., that their torque be ultimately transmitted to the same torque responsive device, in order that the latter may be responsive under all dispositions of the transmission.

Figure 11:
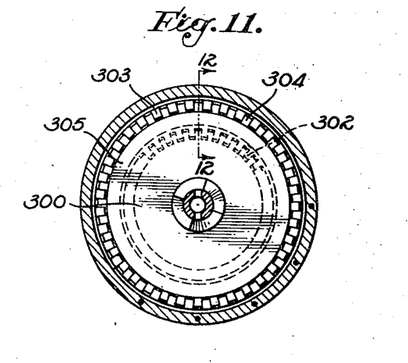
Fig. 11 is a sectional view of a drag assembly alternative to that shown in Fig. 1.
Figure 12:
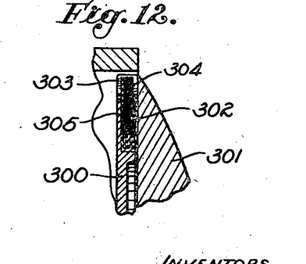
Fig. 12 is a cross-sectional view of Fig. 11 taken as indicated by the line 12—12.

Reverting to the friction drive it is particularly desirable in a fishing reel to have a frictional driving clutch which can slippingly permit a fish to strip the line from the reel when the tension of the line increases to such a degree as to threaten breakage. When such a frictional driving clutch thus functions as a brake, especially when enduring a long run under heavy load, trouble is frequently experienced from the high temperature generated by the friction which may damage the frictional element. As the generation of heat under such conditions cannot be avoided, such friction clutch members have been constructed of metal with heat-resistant material such as brake lining fabric interposed. In the present invention the problem is solved by providing for the rapid dissipation of heat from the wearing surface. The alternating driving and driven plates of a multiple disc clutch are arranged to overlap each other for only a minor fraction of their total width so that the heat generated at their edges is quickly conducted to the remaining major fraction and thence radiated into the air which occupies the interstices between them, or if desired, only one set of discs may be provided with such radiating surfaces extending beyond the area of overlap. Besides a portion of the excess heat being diffused through the bearing supports of the plates the eddying air currents set in motion by rotation of the spool still further accelerate the desired diffusion of heat throughout the real structure from which it is finally radiated to the outer air. The use of discs sufficiently thin to derive the maximum advantage from this described arrangement is made practical by the provision of a plurality of driving supports whereby the weakness of material is compensated by the multiplication of supporting points. The discs may be supported by pins extending through holes in the discs as illustrated in Fig. 1 and Fig. 4. Another desirable method of supporting the discs is shown in Figs. 11 and 12. Referring to these figures, 300 is the driving element and 301 the driven element, for example, the end flange of the reel spool. The driving element 300 is stepped near its outer periphery and the foot of the step is provided with a number of serrations, and the driving friction discs 302 having complementary serrations are mounted thereon so as to be axially movable but angularly fixed with respect to the driving element 300. The driven element 301 has an overhanging flange 303 at its periphery, serrated on its inner edge and having mounted therein a set of driven frictional discs 304 having complementary serrations. The two sets of discs are interleafed in the region of overlap and are compressible in the region of overlap by pressure member 305 which represents an extension of member 300 beyond the step formed to receive the driving discs.

The use of discs sufficiently thin to be resiliently flexible is of great advantage, irrespective of whether a portion of the discs is radially extended beyond the region of overlap to provide heat radiating surfaces. We find that when either the driving discs or the driven discs or both are made sufficiently flexible and resilient to conform to inequalities of the conjugate set arising from lack of suitable alignment, malformed surfaces, and the like, that the smoothness of the drag is very appreciably increased, as is also its effective life. As a rule the conjugate sets should be made of different materials. We have made drags of very superior characteristics comprising five to ten discs made from steel 0.005 inch thick alternating with conjugate discs made from a resilient Bakelite impregnated fabric 1/64 inch thick. We have also made very excellent drags by using 0.005 inch steel discs alternating with 0.005 inch phosphor bronze discs. In all instances a large number of torque transmitting and torque receiving supports were provided for in the driven and driving discs respectively, for example; from ten to twenty supports, in order to distribute the shear load and prevent buckling or shear of the thin materials used.

Friction clutches of the kind described present many advantages among which may be mentioned their very smooth operation, their very rapid dissipation of heat resulting in cooler operation and lessened likelihood of freezing, or burning, the possibility of obtaining greatly multiplied frictional effects with only slight compressive forces due to the number of such thin discs which may be incorporated in a drag, the substantially uniform wear of the frictional surface which may be achieved by limiting the region of overlap to a relatively small radial distance, substantially removed from the center of rotation so that the peripheral speeds on different parts of the frictional surface are substantially equal, and the fact that the conjugate sets need not be coaxially aligned with great accuracy originally or may tolerate a substantial disalignment arising with wear without loss of smooth and efficient operation.

In the examples described the friction disc assembly is mounted near the periphery of the end flange of the reel spool which is advantageous in giving a high moment to the frictional forces, which in most conditions is substantially greater than the moment arising from the tension of the line. Also, a relatively large amount of braking surface may be utilized near the periphery of the flange without much variation in differential speed between the driving and driven discs at different portions of the braking surface which is beneficial in causing smoother action and more uniform wear. Especial attention is further directed to our novel disposition of our driving and control means on the side of the reel opposite the handle, which we have disclosed in Fig. 1, and which we prefer principally because of the freedom thereby conferred upon the driving hand.

Referring to the broader aspects of the click control mechanism it may be stated that the primary purpose of the click mechanism is to afford an audible signal when the fish is hooked and runs away with the line. It is usually desirable to disconnect the click mechanism as soon as the warning has been given. Hitherto controls for click mechanisms have required grasping or the exercise of some other form of dexterity in order to disconnect the click which is a very inconvenient and disturbing operation to be performed while the fish is being played. We have therefore provided that the click control means is put in inoperative position by simple depression of the knob which requires no grasping or dexterity and may be accomplished by any casual type of pressure or blow. While we have illustrated the control means as directly affecting the position of the click ratchet various other dispositions of the exciting ring and ratchet may be used and suitable linkages provided between the control means and the click mechanism such that the latter is rendered inoperative by depression of the control means.

The unitary control means herein disclosed for the control of both free spool clutch and frictional drag element is advantageously adapted to progressively engage the free spool clutch and impose increasing frictional pressure on the drag element when moved in one direction and to diminish the pressure on the drag and ultimately free the spool of clutching restraint when the control element is returned to its original position by a motion in the reverse direction. The control may be actuated by a manually disposable element such as, for instance, a lever or which may be a wheel, a disc or a knob with or without an interposed gear train or other linkage.

The provision of a double cam or other linkage between the unitary control means and the control element for causing an initially rapid travel and subsequently less rapid travel of a thrust element relative to the uniform motion of the control means is of great advantage when a positive clutch is to be engaged or disengaged during the period of rapid response. In some instances a positive free spool clutch may be dispensed with, for example, when a friction clutch is used which is adapted to become substantially frictionless when fully opened so that the spool may be freed of all restraint by sufficient retraction of the friction clutch. Such friction clutches may be considered as combining the functions of a free spool clutch and a friction drag. As a rule considerably more travel or axial motion is required to move such a clutch from a position of complete freedom to a position where it exerts a slight frictional drag than to move the clutch from the latter position to positions corresponding to normally used drag settings. Consequently the use of a control element such as herein described is very advantageous in connection with such friction clutches, the control being arranged to rapidly move the friction clutch from a completely free condition into a condition of frictional contact and thereafter moving the clutch more slowly so that the drag may be accurately and gradually adjusted by a further motion of the control means.

It is to be understood that the detailed description of the above specific embodiments is introduced for the purposes of exposition, and that our inventive concept as defined by the scope of the appended claims may be obviously embodied in various other combinations and structures.

We claim as our invention:

1. In combination in a fishing reel: a driving crank; a driven spool; power transmission means interposed between said driving crank and driven spool for transmitting torque from said driving crank to said driven spool, said transmission means being selectively disposable to provide a high speed drive and a low speed drive; and control means responsive to the torque on said driven spool and including operative connections to said power transmission means to selectively dispose the transmission means in low speed drive when said control means is actuated by relatively high torque and in high speed drive when the control means is actuated by relatively low torque whereby said driven spool is automatically driven at low speed under heavy loads and high speed under light loads.

2. A combination as in claim 1 in which said control means includes a yieldable torque transmitting means, and a counteracting means arranged to restrain substantial yield of said torque transmitting means when the transmitted torque is below a predetermined value and to permit a limited yield when the transmitted torque exceeds said value.

3. In combination in a fishing reel: a driving crank; a driven spool; an epicyclic gear train for the transmission of power therebetween and including a driving member arranged to receive power from said crank, a driven member arranged to transmit power to said spool, and a floating member, so disposed that the fixing of said floating member against rotation causes the driven member to be under driven and rotate slower than and in the same direction as the driving member, said floating member when free tending to rotate oppositely to said driving member; a non-rotating housing; ratchet means associated with said housing and disposed to prevent the floating member from assuming negative rotation and to maintain the train in driving relationship in the absence of other restraint; and releasable integrating means to integrate said train in direct drive relationship and drive it permissively past said ratchet means.

4. In combination in a fishing reel: a driving crank; a driven spool; an epicyclic gear train arranged to transmit power therebetween and comprising a driving member receiving power from said crank, a driven member transmitting power to said spool and a floating member arranged in an epicyclic relationship such that restraint of said floating member against rotation causes the driven member to rotate slower than and in the same direction as the driving member; a non-rotatable element; and ratchet means disposed between said floating member and said non-rotatable element to prevent negative rotation of said floating member relative to the driving member.

5. In combination in a fishing reel: a driving handle; a driven spool; variable speed power transmission gearing therebetween selectively disposable in high and low speed gear ratios; clutch means engageable for disposing said transmission gearing in high speed gear ratio; resilient pressure means for engaging said clutch means; torque responsive reacting means between said handle and spool arranged to nullify the pressure of said resilient pressure means and to disengage said clutch means when the torque reactance of said means exceeds the pressure of the resilient means, said torque responsive means being arranged to transmit the entire torque delivered between said driving handle and said driven spool through said variable speed power transmission gearing both when disposed in high speed gear ratio and when disposed in low speed gear ratio; and ratchet means operatively arranged for disposing said transmission gearing in low speed gear ratio when said clutch means is disengaged.

6. In combination in a fishing reel: a driven spool; a driving handle; a spur-and-pinion gear train therebetween arranged to transmit torque from said handle to said spool; a second spur-and-pinion gear train of relatively higher speed ratio arranged to transmit torque from said handle to said spool; engageable elements operatively arranged to transmit torque from said handle to said spool through said relatively higher speed ratio gear train when said engageable elements are engaged; unidirectional driving means operatively arranged to transmit torque from said handle to said spool through the relatively lower speed ratio gear train when said engageable elements are disengaged; a torque responsive movable member operatively arranged to move in response to torque deliverable from said handle to said spool and arranged to assume one terminal position when said torque is less than a given degree and to assume an opposite terminal position when said torque exceeds said given degree; an operative connection between said torque responsive movable member and said engageable elements, arranged to disengage said engageable elements when said torque responsive movable member is in one terminal position, and to engage said elements when said movable member is in the opposite terminal position; and yieldable holding means arranged to hold said movable member in one terminal position and to yield when said torque exceeds said given degree.

7. In combination in a fishing reel: a driven spool; a driving handle; a non-epicyclic spurand-pinion gear train therebetween arranged to transmit torque between said handle and said spool; a second non-epicyclic spur-and-pinion gear train of relatively higher speed ratio arranged to transmit torque from said handle to said spool; clutch elements operatively arranged to transmit torque from said handle to said spool through said relatively higher speed ratio gear train when said clutch elements are engaged; unidirectional driving means operatively arranged to transmit torque between said handle and said spool through the relatively lower speed ratio gear train when said clutch elements are disengaged; a torque responsive movable member operatively arranged to move in response to torque deliverable between said handle and said spool and arranged to assume one terminal position when said torque is less than a given degree and to assume an opposite terminal position when said torque exceeds said given degree; an operative connection between said torque responsive movable member and said clutch elements, arranged to disengage said clutch elements when said torque responsive movable member is in one terminal position, and to engage said elements when said movable member is in the opposite terminal position; and yieldable holding means arranged to hold said movable member in one terminal position and to yield when said torque exceeds said given degree.

8. In combination in a fishing reel: a driving handle; a driving shaft associated therewith; a driven shaft; a driven spool associated therewith; power transmission means between said shafts arranged to transmit torque therebetween, said power transmission means having a high speed drive means including an engageable member arranged to operatively dispose said high speed drive means in driving relationship between said driving and driven shafts, and a low speed drive means; and control means associated with said power transmission means between said driving and driven shafts to disengage and re-engage said engageable member, said control means comprising a torque responsive movable member, torque converting means, resilient counteracting means, and an operative connection between said movable member and said engageable member, said torque responsive movable member arranged to transmit torque between said power transmission means and one of said shafts and to be reciprocally movable parallel to the axis of rotation of said one shaft, said torque converting means including pressure and thrust elements between said movable member and said one shaft cooperating through surfaces non-parallel to the axis of rotation of said one shaft whereby an axially directed thrust component is produced when torque is transmitted between said movable member and said one shaft, said resilient counteracting means arranged to urge said movable member by means of said operative connection to engage said engageable member, said operative connection arranged to integrate said movable member with said engageable member so that said reciprocal movement of said movable member alternatively disengages and re-engages said engageable member.

9. A combination as in claim 8 in which the low speed drive means includes unidirectional driving means, said unidirectional driving means being arranged to be permissive of over-running in said low speed drive means between said driving and driven shafts when said engageable member of said high speed drive means is engaged and operatively arranged to engage the low speed drive means in driving relationship between said driving and driven shafts when said engageable member is disengaged.

10. In combination in a fishing reel: a driving crank; a driven spool; torque transmitting means therebetween including a high speed drive means and a low speed drive means; an engageable member operatively arranged to engage said high speed drive means in driving relationship between said driving crank and said driven spool; a movable torque transmitting and torque responsive member arranged to be movable axially between opposite terminal positions when the transmitted torque is relatively high and relatively low; torque converting means to move said movable member axially toward one terminal position when the transmitted torque is relatively high; resilient pressure means to move said movable member axially toward its opposite terminal position when the transmitted torque is relatively low; and operative connections between said movable member and said engageable member whereby said engageable member is engaged when the transmitted torque is relatively low and is disengaged when the transmitted torque is relatively high.

11. A combination as in claim 10 in which said low speed drive means includes ratchet means arranged to permit the driven spool to over-run the speed ratio of said low speed drive means with respect to the driving crank and to prevent the spool from under-running the speed ratio of said low speed drive means with respect to the crank.

12. A combination as in claim 10 in which said torque converting means comprises a rotating torque transmitting element, a rotatable torque transmitting and axially movable element cooperating therewith to transmit torque between said crank and spool, thrust surfaces between said elements for transmitting torque between them, said thrust surfaces being non-parallel to the axis of rotation of at least one element whereby the transmission of torque through said surfaces produces an axially directed thrust component tending to effect relative axial displacement of said elements.

13. In combination in a fishing reel: a driving crank; a driven spool; an epicyclic gear train for the transmission of torque therebetween including a driving member arranged to receive torque from said crank, a driven member arranged to transmit torque to said spool, and a floating member, said epicyclic members being so disposed and interrelated that the fixing of said floating member against rotation causes the driven member to rotate faster than and in the same direction as the driving member; a torque transmitting and torque responsive movable member between said driving member and said spool arranged to transmit torque therebetween and to be movable axially parallel to the axes of rotation of said driven member and said spool in response to said torque; releasable holding means to hold said floating member fixed against rotation; an operative connection between said torque responsive movable member and said releasable holding means arranged to release said holding means; resilient counteracting means arranged to engage said holding means; and unidirectional integrating means disposed in said epicyclic gear train to permit over-running of the driven member relative to the driving member and to prevent over-running of the driving member relative to the driven member whereby release of said holding means results in integration of said epicyclic gear train and produces a unitary speed ratio between said driving and driven members.

14. In combination in a fishing reel: a driving crank; a driven spool; constant mesh gearing disposed to transmit torque between said crank and spool, including a high speed train and a low speed train; connectible and disconnectible torque transmitting clutch means arranged to connect and disconnect said high speed train between said crank and spool; and ratchet means arranged to disconnect said low speed train when said high speed train is connected and to connect said low speed train when said high speed train is disconnected.

15. In combination in a fishing reel: a driving crank; a driven spool; constant mesh gearing disposed to transmit torque between said crank and spool, including a high speed train and a low speed train; engageable torque transmitting means arranged to connect and disconnect said high speed train between said crank and spool; ratchet means associated with said low speed train and arranged to disconnect said low speed train when said high speed train is connected and to connect said low speed train when said high speed train is disconnected; an intermediate member between said constant mesh gearing and said spool arranged to transmit torque from both said high speed train and said low speed train to said spool and from said spool to both said high speed train and said low speed train, said torque transmitting intermediate member arranged to be torque responsive and axially movable in response to the torque transmitted through it; and an operative connection between said intermediate member and said engageable torque transmitting means.

16. In combination in a fishing reel: a driving crank; a driven spool; constant mesh gearing disposed to transmit torque between said crank and spool, including a high speed train and a low speed train; engageable torque transmitting means arranged to connect and disconnect said high speed train between said crank and spool; ratchet means associated with said low speed train and arranged to disconnect said low speed train when said high speed train is connected and to connect said low speed train when said high speed train is disconnected; an intermediate member between said constant mesh gearing and said spool arranged to transmit torque from both said high speed train and said low speed train to said spool and from said spool to both said high speed train and said low speed train, said intermediate member arranged to be torque responsive and axially movable in response to the torque transmitted through it; resilient pressure means of predetermined value arranged to move said intermediate member axially counter to the torque responsive axial movement of said intermediate member when said predetermined pressure value exceeds the force of said torque responsive axial movement and to yield to permit the said torque responsive axial movement of said intermediate member when the force of said torque responsive movement exceeds said predetermined pressure value of said resilient pressure means; and an operative connection between said intermediate member and said engageable torque transmitting means, whereby the reciprocal movement of said intermediate member alternatively disengages and re-engages said engageable torque transmitting means.

17. In a fishing reel: a crank; a spool adapted to be driven by said crank; torque transmitting driving means between said crank and spool for rapidly revolving the spool when the torque is light; and means for decreasing the relative rotation of the spool to the driving means automatically controlled by the torque in said torque transmitting driving means.

18. In a fishing reel: a crank; a spool; change-speed torque transmitting means therebetween; and automatic speed changing means controlled by the transmitted torque to change speed in said torque transmitting means.

19. In combination in a fishing reel: a driving handle; a driven spool; variable speed power transmission gearing between said handle and said spool, selectively disposable in high and low gear ratios; clutch means engageable for disposing said transmission gearing in high gear ratio; resilient pressure means between said handle and spool for engaging said clutch means; torque responsive reacting means responsive to the torque transmitted between said handle and said spool and arranged to nullify the pressure of said resilient pressure means and to disengage said clutch means when the torque reactance of said torque responsive reacting means exceeds the pressure of the resilient pressure means, said torque responsive means being also arranged to transmit torque between said handle and said spool; and ratchet means operatively arranged for disposing said transmission gearing in low gear ratio when said clutch means is disengaged.

20. In combination in a reel: a driving element; a driven spool; variable speed power transmission gearing between said element and said spool selectively disposable in high and low speed gear ratios; engageable clutch means operatively arranged for disposing said transmission gearing in high speed gear ratio when engaged; unidirectional ratchet means operatively arranged to dispose said transmission gearing in low speed gear ratio when said high speed clutch means is disengaged; and torque responsive control means between said driving element and said driven spool for alternatively engaging and disengaging said clutch means, said control means comprising a reciprocally movable member, resilient pressure means arranged to move and yieldingly hold said reciprocally movable member towards and in one terminal position, torque responsive reacting means operatively disposed to react to torque between said driving element and said driven spool and arranged to move and hold said reciprocally movable member towards and in an opposite terminal position when its torque reactance exceeds the force of said resilient pressure means, and an operative connection from said reciprocally movable member to said clutch means, whereby said reciprocally movable member in one terminal position operates to engage said clutch means and in another terminal position operates to disengage said clutch means, said torque responsive reacting means arranged to transmit the entire torque developed between said driving element and said driven spool both when said variable speed power transmission gearing is disposed in high speed gear ratio and when it is disposed in low speed gear ratio.

21. In combination in a fishing reel: a driving crank; a driven spool; change-speed power transmission mechanism therebetween comprising a co-axial radial appurtenance of said crank, gearing pivotally carried thereon and rotatable therewith and independently rotatable with respect thereto, an internally toothed gear meshed with said gearing, and a central driven pinion gear meshed with said gearing; releasable holding means arranged to hold stationary said internally toothed gear; means for releasing said holding means; and unidirectional ratchet means between two adjacent relatively movable elements of said power transmission mechanism arranged to be permissive of relative motion therebetween when said internally toothed gear is held stationary.

22. A reel comprising, in combination, a spool, driving means including change speed gearing means for rotating the spool at different speeds, a shaft driven by the change speed gearing means, a disengaging clutch device driven by the shaft, a rotatable member driven by the clutch device, a frictional device connected between the rotatable member and the spool, and means to constrain the shaft against reverse rotation.

23. A reel comprising, in combination, a spool; driving means including change speed gearing means for rotating the spool at different speeds, resilient pressure means arranged to maintain, said change speed gearing in high speed ratio, and torque-responsive means arranged to neutralize said resilient pressure means; a shaft driven by the change speed gearing means; a disengaging clutch device driven by the shaft; a rotatable member driven by the clutch device; a frictional device connected between the rotatable member and the spool; and means to constrain the rotatable member against reverse rotation.

24. A reel comprising, in combination, a spool; driving means including automatically operative change speed means for rotating the spool at different speeds; a shaft driven by the automatic change speed means; a disengaging clutch device driven by the shaft; a rotatable member driven by the clutch device; a frictional device connected between the rotatable member and the spool; and means to constrain the rotatable member against reverse rotation.

25. A reel comprising, in combination, a driving handle; a spool; driving means drivable by said driving handle including automatically operative change speed gearing means for rotating the spool at different speeds, said automatic change speed gearing means comprising torque-responsive means operatively arranged between the handle and the spool to change said change speed gearing means to high speed ratio when the torque transmitted therethrough is relatively low and to low speed ratio when said transmitted torque is relatively high; a shaft driven by the automatic change speed gearing means; a disengaging clutch device driven by the shaft; a rotatable member driven by the clutch device; a frictional device connected between the rotatable member and the spool; and means to constrain the shaft against reverse rotation.

26. In combination in a fishing reel: a stationary case; a spool arranged to be freely rotatable therein; driving means including change speed gearing means for rotating the spool at different speeds; a shaft arranged to be freely rotatable within said spool and drivable by said change speed gearing means; a disengaging clutch device driven by the shaft; a rotatable member driven by said shaft through said clutch device and arranged to be movable axially; externally operable means for moving the rotatable member axially; frictional driving means between the rotatable member and the spool; anti-friction thrust bearing means between the spool and the case arranged to support axial thrust through the spool from the frictional driving means; and unidirectional restraining means to prevent reverse rotation of the rotatable member.

27. In combination in a fishing reel: a driving crank; a driven spool; automatic change speed power transmission mechanism therebetween comprising a co-axial radial appurtenance of said crank, gearing pivotally carried thereon and rotatable therewith and independently rotatable with respect thereto, an internally toothed gear meshed with said gearing, a central driven pinion gear meshed with said gearing, releasable holding means arranged to hold stationary said internally toothed gear, torque-responsive means for releasing said holding means, and unidirectional ratchet means between two adjacent relatively movable elements of said power transmission mechanism arranged to be permissive of relative motion therebetween when said internally toothed gear is held stationary; a shaft driven by said central driven pinion gear; a disengaging clutch device driven by the shaft; a rotatable member driven by the clutch device and arranged to be axially movable; a frictional device connected between the rotatable member and the spool; means to move the rotatable member axially; and means to constrain the rotatable member against reverse rotation.

REGINALD BLAND.
REGINALD BARRETT BLAND.

REFERENCES CITED

The following references are of record in the file of this patent:

UNITED STATES PATENTS

| Number | Name | Date |
| --- | --- | --- |
| 2,136,227 | Stanley | Aug. 9, 1938 |
| 1,189,232 | Benjamin | July 4, 1916 |
| 1,508,080 | Wise | Sept. 9, 1924 |
| 463,377 | Atkinson | Nov. 17, 1891 |
| 1,470,640 | Pelletier | Oct. 16, 1923 |
| 2,113,515 | Montgrand | Apr. 5, 1938 |
| 797,383 | Sturtevant et al. | Aug. 15, 1905 |
| 2,139,221 | Bronander | Dec. 6, 1938 |
| 739,255 | Bradley et al. | Sept. 15, 1903 |
| 838,915 | Sykes | Dec. 18, 1906 |
| 1,541,267 | Kittredge | June 9, 1925 |